(12) United States Patent
Durupt et al.

(10) Patent No.: US 10,836,355 B2
(45) Date of Patent: Nov. 17, 2020

(54) OPTICAL RAIN SENSOR AND METHOD FOR DETERMINING A MINIMAL RAIN DROP SIZE

(71) Applicant: MEAS France SAS, Toulouse (FR)

(72) Inventors: Emilien Durupt, Francarville (FR); Tom Fougere, Toulouse (FR)

(73) Assignee: MEAS FRANCE, Toulouse (FR)

( * ) Notice: Subject to any disclaimer, the term of this patent is extended or adjusted under 35 U.S.C. 154(b) by 0 days.

(21) Appl. No.: 16/503,416

(22) Filed: Jul. 3, 2019

(65) Prior Publication Data

US 2020/0010053 A1    Jan. 9, 2020

(30) Foreign Application Priority Data

Jul. 9, 2018  (EP) .................... 18305904

(51) Int. Cl.
*G08B 21/20* (2006.01)
*B60S 1/08* (2006.01)
*G01N 27/22* (2006.01)

(52) U.S. Cl.
CPC ........... *B60S 1/0833* (2013.01); *B60S 1/0877* (2013.01); *G01N 27/223* (2013.01)

(58) Field of Classification Search
CPC .... B60S 1/0822; B60S 1/0877; B60S 1/0833; B60S 1/0825; B60S 1/0829; B60S 1/0844; B60S 1/0818; B60S 1/0888; G01N 27/223; G01N 2021/4709; G01N 21/538; G01N 27/226; G01N 2021/945; G01N 21/552; F24F 13/08; F24F 13/084; F24F 2221/52; F24F 11/30; F24F 13/082; B32B 17/10036; B32B 17/10174; B60Q 1/1423; B60Q 2300/3321; B60R 2001/1223; E06B 7/02; G01J 1/42; G01S 2013/9327; G01S 7/4816; G03B 19/023; H03K 2217/960775; H03K 17/955; H03K 2217/960765; H04N 5/335;

(Continued)

(56) References Cited

U.S. PATENT DOCUMENTS 5,659,294 A * 8/1997 Schroder ............... B60S 1/0822
                                                                                        200/61.05
6,397,161 B1 * 5/2002 Tanaka .................. B60S 1/0818
                                                                                        702/134

(Continued)

FOREIGN PATENT DOCUMENTS

DE    19701258 A1    7/1997
DE    10127990 A1    12/2002

(Continued)

*Primary Examiner* — Daniel Previl

(57) ABSTRACT

The present invention relates to a rain sensor detecting the size of rain drops based on optical effects. The rain sensor is mounted on a first surface of a pane in order to detect the amount of moisture on an opposing second surface of the pane. The rain sensor comprises at least one emitter for emitting electromagnetic radiation, directed from the first surface to the second surface to form at least two rain-sensitive areas on the second surface At least one receiver is included for sensing radiation emitted by the emitter and that has been internally reflected at the rain-sensitive areas. The rain sensor generates an output signal indicative of an amount of moisture on the rain-sensitive area. A control unit calculates a minimal droplet size based on the output signal.

20 Claims, 8 Drawing Sheets

(58) Field of Classification Search
CPC .... Y10S 318/02; Y10S 15/15; Y10S 428/913; B41M 5/1655; B41M 5/3275; B41M 5/3335; B41M 5/3375; B41M 5/3377; Y10T 428/24876
USPC .............. 340/602, 601, 600, 604, 618, 619, 340/636.11, 675, 680, 3.1
See application file for complete search history.

(56) References Cited

U.S. PATENT DOCUMENTS

| | | | |
|---|---|---|---|
| 2005/0016275 A1* | 1/2005 | Pankey | B60S 1/0818 |
| | | | 73/579 |
| 2007/0272884 A1* | 11/2007 | Utida | G06K 9/4647 |
| | | | 250/573 |
| 2011/0242540 A1* | 10/2011 | Shyu | G01N 21/55 |
| | | | 356/445 |
| 2012/0153154 A1* | 6/2012 | Rothenhaeusler | ............................ |
| | | | G06K 9/00791 |
| | | | 250/338.4 |
| 2015/0001201 A1* | 1/2015 | Adler | H02S 40/12 |
| | | | 219/213 |
| 2015/0120093 A1* | 4/2015 | Renno | G01N 21/55 |
| | | | 701/3 |

FOREIGN PATENT DOCUMENTS

| | | |
|---|---|---|
| DE | 102005006861 A1 | 8/2006 |
| EP | 1257444 B1 | 8/2005 |
| EP | 2883034 B1 | 2/2017 |
| WO | 2009003473 A1 | 1/2009 |

* cited by examiner

OPTICAL RAIN SENSOR AND METHOD FOR DETERMINING A MINIMAL RAIN DROP SIZE

CROSS-REFERENCE TO RELATED PATENT APPLICATION

This patent application claims the benefit of European Patent Application No. 18305904.7 filed on Jul. 9, 2018, which patent application is hereby incorporated by reference in its entirety.

FIELD

The present invention relates to a rain sensor detecting the size of rain drops based on optical effects. The invention further relates to a method for determining a minimal rain drop size based on optical effects. One possible application of such sensors is to control windows such as roof windows in order to detect rainfall and subsequently close open windows during a rainfall. Another application is to mount a rain sensor on the windshield of a car in the region of the windshield wiper. Depending on the amount of droplets present on the active area of the sensor on the windshield, these rain sensors provide to an evaluation circuit a signal which is used to control the windshield wiper.

BACKGROUND

There exist rain sensors based on several principles. Some are based on piezoelectric effects (e.g., as shown in WO 2009/003473 A1). Others, such as shown in DE 10 2005 006 861 A1, use conductor structures with inductive and capacitive components corresponding to resonant circuits, such that wetting of the windshield leads to a change in the frequency behavior of the conductor arrangement. Thereby the shift of the resonance frequency may be employed as a measure for the amount of moisture precipitated close to the sensor element, as disclosed by DE 10127990 A1.

Another class of rain sensors is based on electrically conducting electrodes separated by an insulating gap which may be spanned by a water drop. These sensors may be resistive, in which case the electrodes are placed on the outer surface of the window to be contacted directly by water drops, or capacitive, in which case the electrodes are separated from the water drops by a dielectric coating or a layer of glass such that the water drops change the capacity between the electrodes. The concept shown in EP 2 883 034 B1 uses conductive strips. From U.S. Pat. No. 5,659,294 A it is known to employ two conductive paths which have conductive path sections that are parallel to each other and which engage in a comb-like manner in each other but are not electrically connected to each other. During a rainstorm, the electrically conductive strips or paths are bridged by drops of water with resulting electric characteristics describable by an electric measuring graph.

Other sensors are based on imaging the vehicle windshield and subjecting the image to a frequency analysis, such as disclosed in US 2007/0272884 A1. Here, when the high-frequency component is detected, the image processor detects a width of a change region where a change in graduation of the image occurs. When the width of the change region is within a predetermined range corresponding to a diameter of a raindrop, the image processor determines that raindrop is on the windshield.

Many rain sensors (as shown, for example, in EP 1257444 B1, DE 197 01 258 A1, and US 2011/0242540 A1) use total internal reflection of light at the outer surface of a windshield. An emitter in a housing attached to the inner surface of the windshield emits radiation which is reflected at the outer surface and thus detected via a receiver that resides in the same housing. Regions of the outer surface covered with droplets will not show total internal reflection, such that the receiver will detect a loss in signal, as a measure for the amount of water on the outer surface.

A sudden change in the signal detected by such a rain sensor over time corresponds to an individual rain drop hitting the windshield. Thus, from the time-resolved signal and the size of the surface area probed by the rain sensor, the number of droplets per surface unit per unit time, denoted as rain intensity, may be inferred.

However, the rain intensity is often not sufficient to accurately assess driver visibility. Consequently, the object underlying the present invention is to provide a rain sensor that is more accurate in determining driver visibility, at the same time being robust and economic to factorize.

SUMMARY

This object is solved by the subject matter of the independent claims. Alternative embodiments of the present invention are the subject matter of the dependent claims.

Thus, in order to yield a full picture to allow for a better control of the wiper, the present invention proposes to also determine the size of rain drops. The invention, in particular, relates to a rain sensor to be mounted on a first surface of a pane in order to detect an amount of moisture on an opposing second surface of the pane, at least one emitter for emitting electromagnetic radiation, directed from the first surface to the second surface to form at least one rain-sensitive area on the second surface, at least one receiver for sensing radiation emitted by the emitter and that has been internally reflected at the rain-sensitive area, and for generating an output signal indicative of the amount of moisture on the rain-sensitive area, and a control unit that is operable to calculate a minimal droplet size based on the output signal.

In one embodiment, the rain sensor comprises n emitters with n≥1, the emitters emitting radiation towards n separate rain-sensitive areas, wherein the rain-sensitive areas form a linear chain, with equal or unequal distances between adjacent rain-sensitive areas.

In another embodiment, the rain comprises $m^2$ emitters with m≥2, the emitters emitting radiation towards $m^2$ separate rain-sensitive areas, where the rain-sensitive areas form a quadratic array. Each arrangement has the advantage that the change in the optical signal scales accordingly to the minimal rain drop size, such that the minimal rain drop size may be easily determined from the change in the optical signal. Each arrangement has a particular relationship between the optical signal and the minimal rain drop size.

The rain sensor may further comprise a radiation focusing means for guiding the electromagnetic radiation and an optical coupling to be arranged between the pane and the optical focusing means. Thereby the radiation may be used in an efficient manner, avoiding losses.

The invention further includes a method for determining a minimal rain droplet radius ($R_{min}$) from the signal of a rain sensor, the rain sensor to be mounted on a first surface of a pane in order to detect an amount of moisture on an opposing second surface of the pane, wherein the rain sensor comprises at least one emitter for emitting electromagnetic radiation, at least one receiver for sensing radiation, and a control unit, said method comprising the following steps: (a)

directing the electromagnetic radiation from the first surface to the second surface to form at least one rain-sensitive areas on the second surface; (b) detecting the electromagnetic radiation emitted by the emitter wherein the radiation has been internally reflected at the rain-sensitive areas; (c) generating an output signal indicative of an amount of moisture on the rain-sensitive area; and (d) calculating a minimal droplet size based on the output signal.

In some embodiments of the invention, the at least one rain-sensitive area has an essentially circular outline. Also, a linear outline is possible. In some embodiments of the invention, a plurality of rain-sensitive areas with identical radii r (and diameter D=2r) is generated. In some embodiments of the invention, the rain-sensitive areas form a circular or a linear array.

In some embodiments of the invention, the rims of adjacent rain-sensitive areas are distanced apart by a distance δ. Here, the relative signal drop ΔS is calculated and said minimal drop size is calculated as $R_{min}=f(n, D, \delta, \Delta S)$. The equation depends on the geometry of the active surface (circle, square, linear chain, quadratic array . . . ) of the sensor and on the shape of the droplet.

In some embodiments of the invention, there is only a single rain-sensitive area. In this case, the minimal droplet radius scales with the square root of the relative signal drop.

The accompanying drawings are incorporated into the specification and form part of the specification to illustrate several embodiments of the present invention. These drawings, together with the description serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention, as illustrated in the accompanying drawings, in which like references refer to like elements.

DETAILED DESCRIPTION

Figure 1:
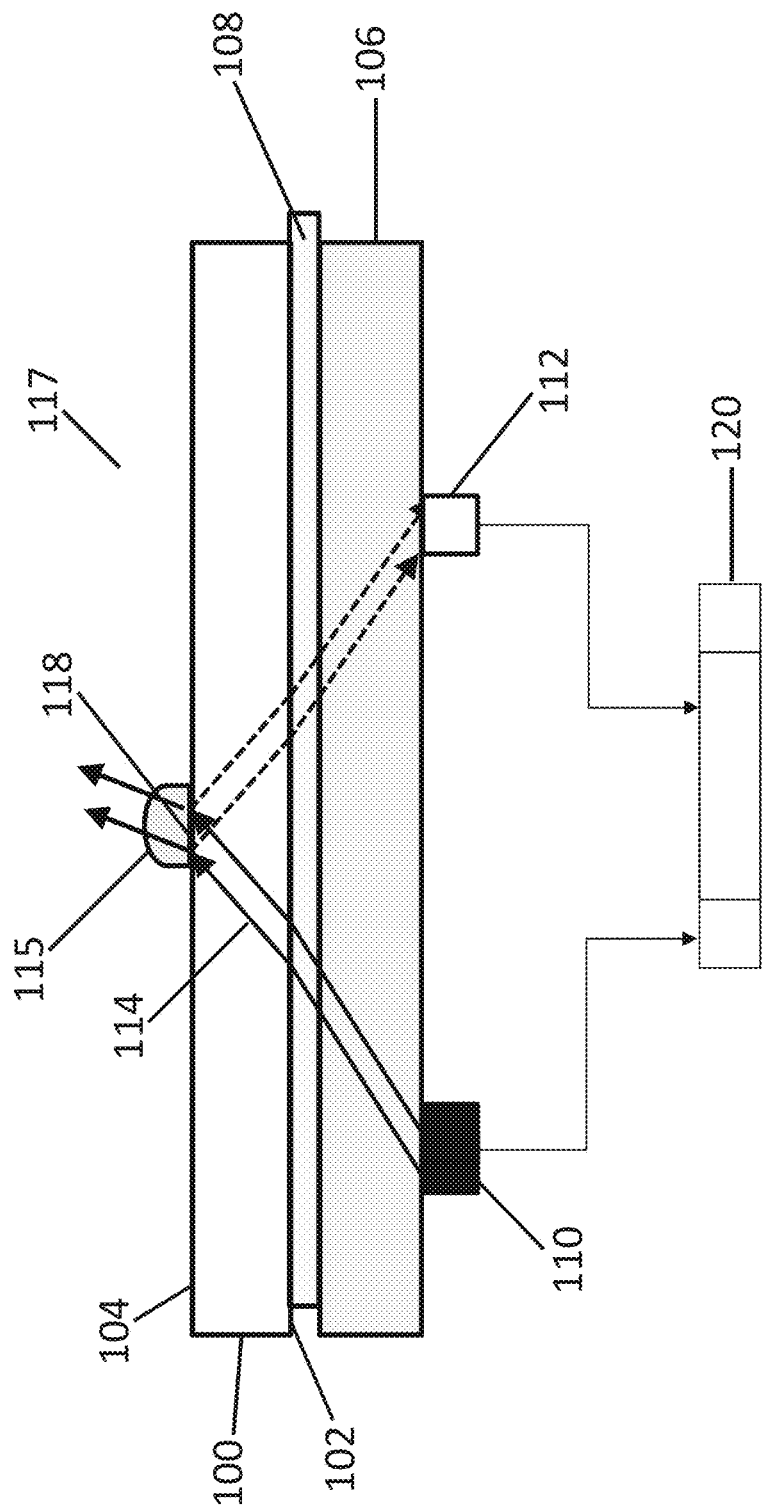
FIG. 1 depicts the principle setup of a rain sensor based on total internal reflection of radiation emitted by a single emitter.

The present invention will now be explained in more detail with reference to the Figures and firstly referring to FIG. 1. As shown in FIG. 1, a pane 100 has a first surface 102 and a second surface 104. In the context of a rain sensor controlling the windshield wiper of a vehicle, the first surface 102 points to the interior of the vehicle. In the context of a rain sensor controlling the closure of a roof window of a house, the first surface 102 points to the interior of the house.

A solid layer 106 is coupled to the first surface 102 of the pane 100 via an intermediate soft layer 108 that may consist of a gel. At the side of the solid layer 106 opposing the soft layer, at least one light emitting diode (LED) 110 and at least one photodiode 112 are mounted. The emitter may emit visible or infrared light. The solid layer 106 and the soft layer 108, as well as the windshield 100, are transparent for the light emitted by the emitter.

Optical elements collimate the light emitted by the emitter. The collimator is configured such that the incident light beam 114 from the emitter 110 enters the windshield 100 in a manner that the light beam forms with the surface normal an angle which is larger than a critical angle (which depend on the optical index of the windshield and the one of the atmosphere). Therefore, when the second surface 104 is dry and clean, the light will be reflected back from the outer surface of the windshield to the detector 112 due to total internal reflection.

The area at the second surface 104 which is irradiated by the light emitted by the emitter 110 is denoted as rain-sensitive area 118.

When the area on the second surface of the pane hit by the light beam is covered by a rain drop 115, the light will not be reflected but instead be transmitted into the half space 117 above the second surface. The emitter 110 and the receiver 112 are connected to a power and measurement circuit 120 which receives the output signal from the photodiode 112 and, furthermore, drives the LED 110.

The setup depicted in FIG. 1 contains only a single rain-sensitive area 118. If multiple emitters and/or sensors are employed and the light is suitably guided by optical elements, multiple rain-sensitive areas 118 can be obtained.

Figure 2:
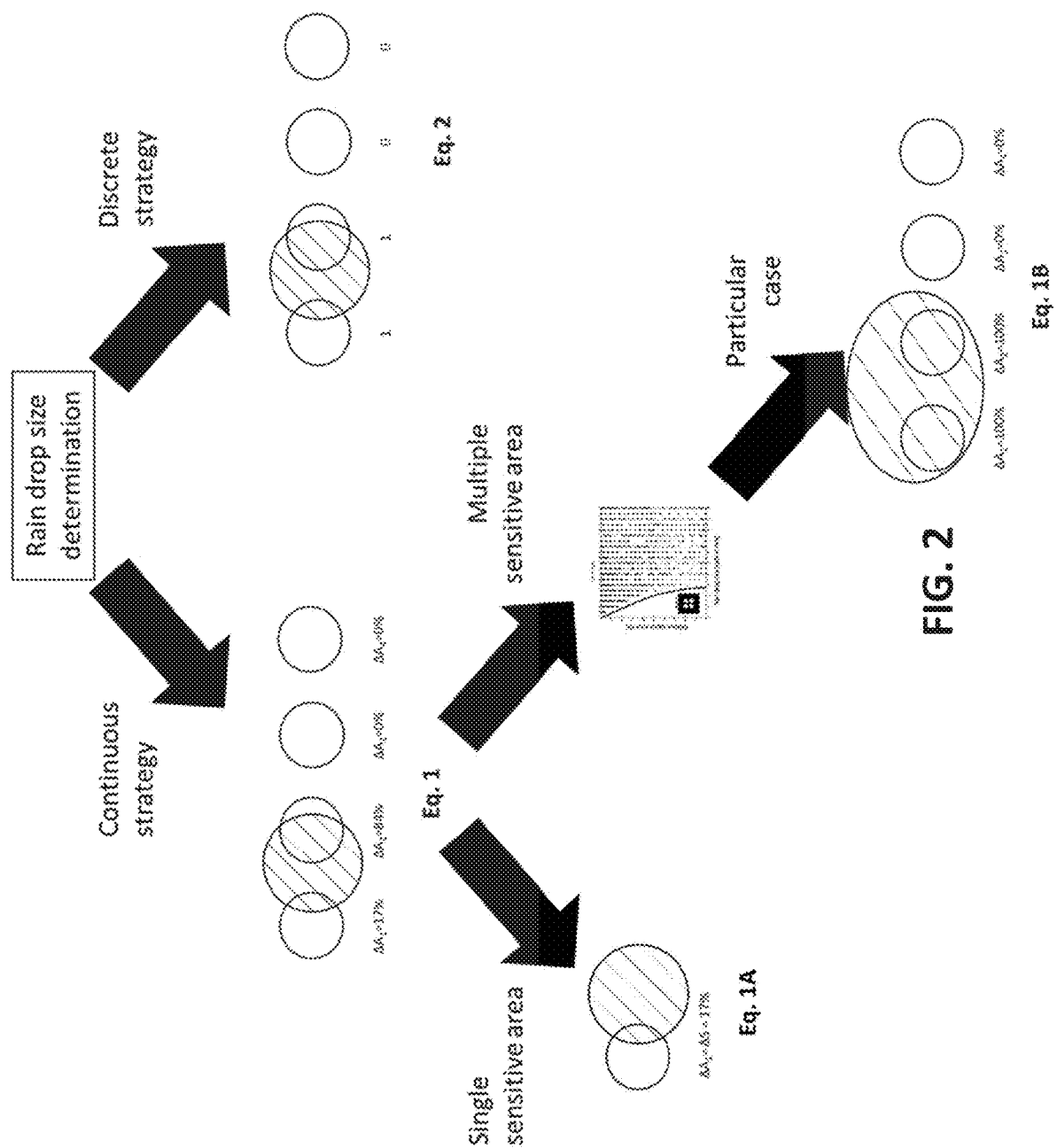
FIG. 2 illustrates two approaches to evaluate minimal rain drop sizes, comprising a continuous and a discrete strategy.

FIG. 2 shows two approaches for determining a minimal rain droplet size, the approaches comprising a continuous and a discrete strategy. The continuous strategy is to determine the fraction of rain-sensitive area covered by a rain drop. The discrete strategy is to determine the number of rain-sensitive areas touched by a rain drop.

Figure 3:
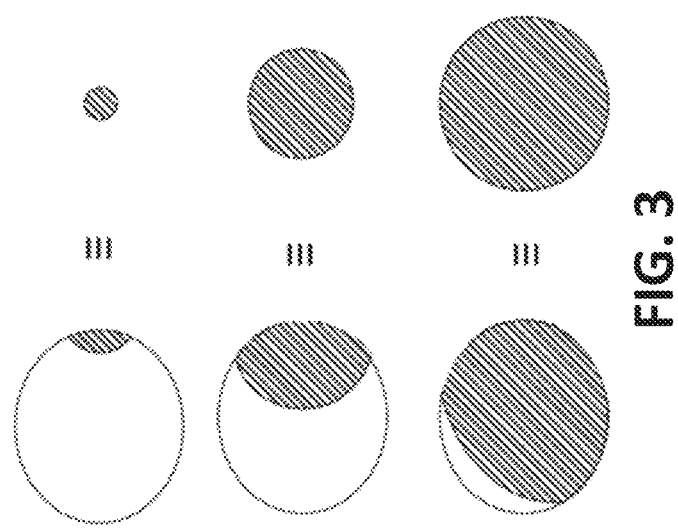
FIG. 3 shows three scenarios of a single rain-sensitive area being partially covered by a rain droplet, compared to the respective droplet with minimal radius.

FIG. 3 shows the principle of the measure of the minimum rain drop size according to the continuous strategy applied to a single rain-sensitive area. The left column shows three scenarios of a single rain-sensitive area (white circle) being partially covered by a rain droplet (dark circle). The right column shows the respective droplet with minimal radius, defined such that the area of the droplet with minimal radius is equal to the area of the rain-sensitive area covered by the real droplet. If the radius of the rain-sensitive area is denoted as r and the minimal droplet radius as $R_{min}$, the relative signal drop, $\Delta S$, is given by $\Delta S = R_{min}^2/r^2$, with $R_{min} \leq r$. Thus, $R_{min} = \Delta S^{1/2} r$. This principle can be adapted with multiple rain-sensitive areas.

Figure 4:
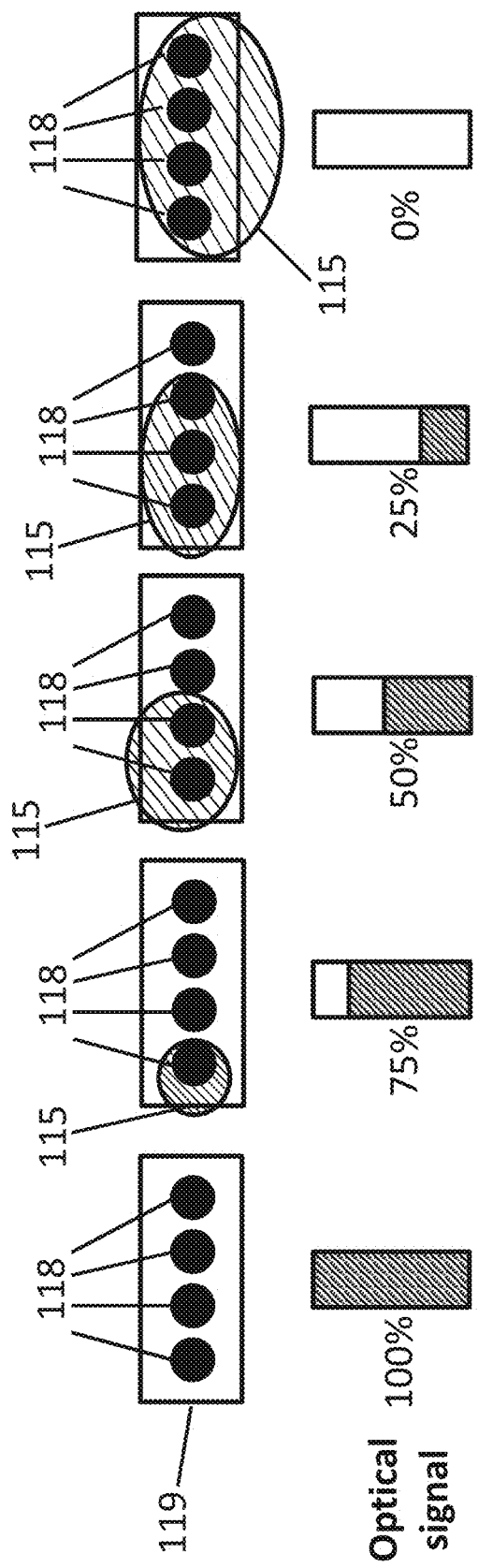
FIGS. 4A to 4E schematically illustrate the geometry of rain drops covering rain-sensitive areas and the corresponding optical signals.

FIG. 4 (top panel) shows four rain-sensitive areas 118 arranged in a chain 119 in a view perpendicular to the windshield. The rain-sensitive areas are all of equal size and exhibit typical radii r of 0.2 mm to 10 mm. A typical distance D between the centers of adjacent rain-sensitive areas 118 is 0 up to 10 mm.

As shown FIG. 4A, all rain-sensitive areas 118 are dry. In FIG. 4B, a configuration is shown where a single rain drop 115 covers one of the rain-sensitive areas. Furthermore, FIGS. 4C to 4E show configurations in which a rain drop covers two, three, or four, respectively, rain-sensitive areas 118. In the bottom panel, the corresponding optical signal is indicated. If no rain-sensitive area 118 is covered by a rain droplet, the optical signal adopts the maximum possible value, 100%. When a single rain-sensitive area is covered by a rain droplet, the relative optical signal is 75%. Furthermore, when two rain-sensitive areas are covered by a rain droplet, the relative optical signal is 50%. When three rain-sensitive areas are covered by a rain droplet, the relative optical signal is 25%. Finally, when all four rain-sensitive areas are covered by a rain droplet, the relative optical signal is 0%.

In FIGS. 4B to 4E, depending on the droplet size, either one, two, three or four rain-sensitive areas are fully covered by the droplet. However, for intermediate droplet sizes, or if the droplet is displaced vertically or horizontally, the droplet might cover rain-sensitive areas also only partially.

If $A_i$ with $i=1, \ldots, n$ denotes the size of rain-sensitive area i, and $\Delta A_i$ the size of rain-sensitive area i covered by a rain droplet, the fraction $\Delta a = \Sigma_i \Delta A_i / \Sigma_i A_i$ is the relative size of rain-sensitive area covered by a droplet. The latter is equal to the relative signal drop, i.e., $\Delta a = \Delta S$.

Distributions of signal intensities observable for given rain drop sizes may be obtained from Monte Carlo simulations. Here, for each droplet size, droplets are placed randomly, with their centers uniformly distributed in a rectangular area enclosing the four rain-sensitive areas. For each position, the relative size of the fraction of rain-sensitive area covered by the droplet, and, thus, the corresponding relative signal, is determined.

Figure 5:
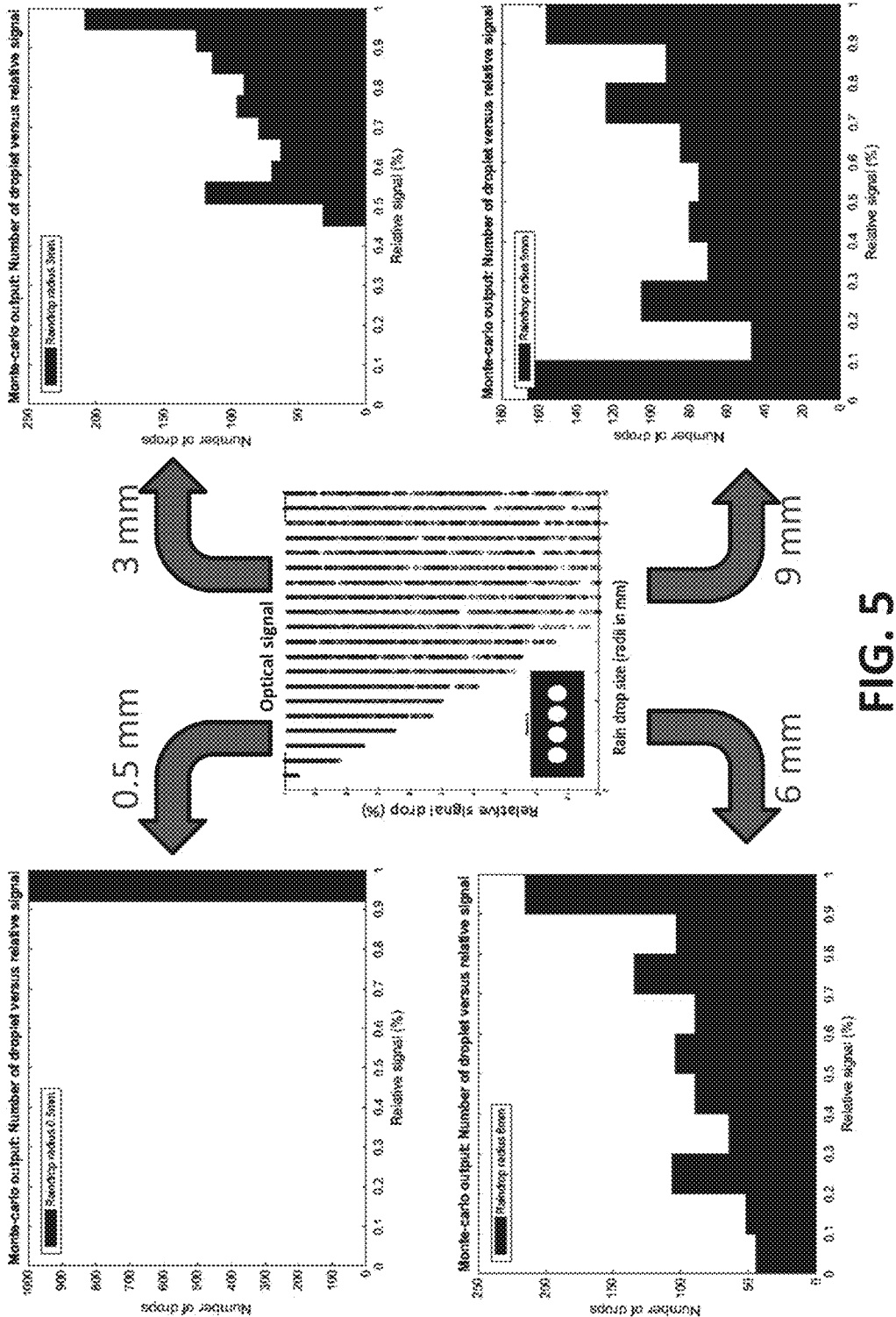
FIG. 5 shows distributions of relative optical signals for different rain drop sizes and relative optical signals observed as a function of rain drop size.

Distributions of signal intensities observable for given rain drop sizes obtained from such simulations are shown in FIG. 5. In the limit of vanishing droplet size, a maximum of the radiation emitted by the emitter and hitting the outer surface at any part of the rain-sensitive areas will be detected by the receiver, leading to a maximum signal intensity of one. If parts of the rain-sensitive areas are covered by the rain droplet, signals between 100% and a lower bound which depends on the size of the rain droplet are observed. The distributions of relative signals for various drop sizes are shown in FIG. 5 (bottom).

FIG. 5 (top) indicates that for the linear arrangement of rain-sensitive areas 118 shown in FIG. 4, the maximum change of the signal drop $\Delta S$, $\Delta S_{max}$, increases with the radius of the rain droplet R in a linear fashion.

Figure 6:
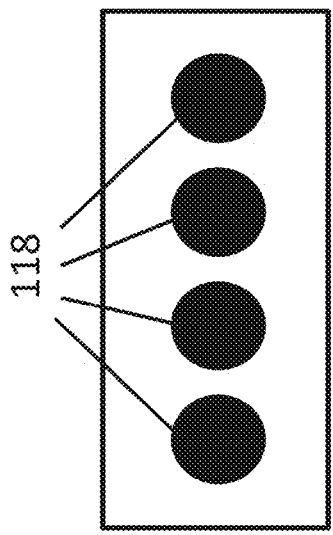
FIG. 6 shows a first advantageous arrangement of rain-sensitive areas.
Figure 7:
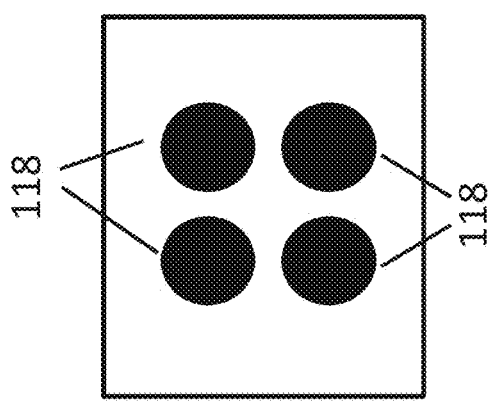
FIG. 7 shows an alternative arrangement of rain-sensitive areas.
Figure 8:
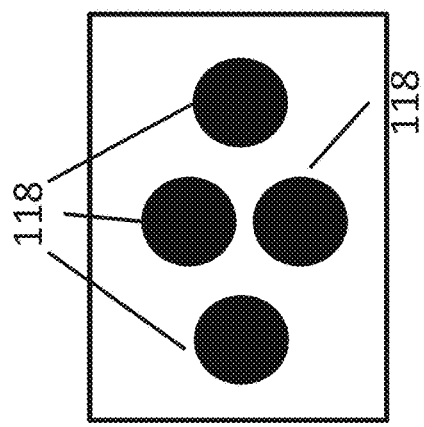
FIG. 8 shows a second alternative arrangement of rain-sensitive areas.
Figure 9:
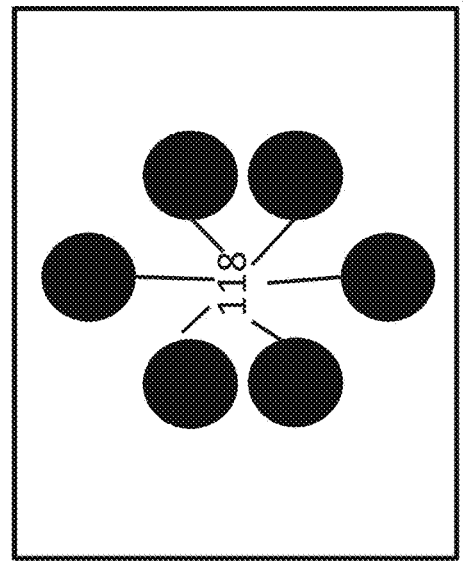
FIG. 9 shows a third alternative arrangement of rain-sensitive areas.
Figure 10:
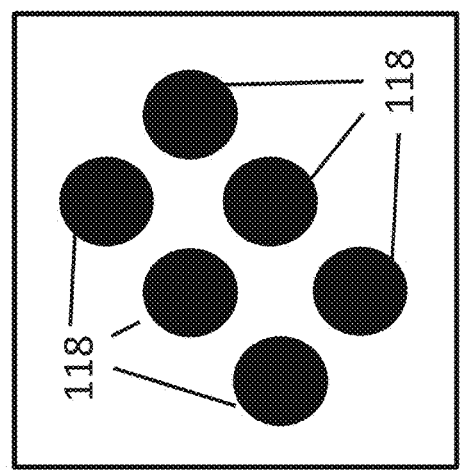
FIG. 10 shows a fourth alternative arrangement of rain-sensitive areas.

As shown in FIGS. 7 to 10, in alternative embodiments (as compared to the linear arrangement depicted in FIG. 6), rain-sensitive areas 118 may be located on the corners of a square, diamond, or hexagon, or form a rectangle.

Figure 11:
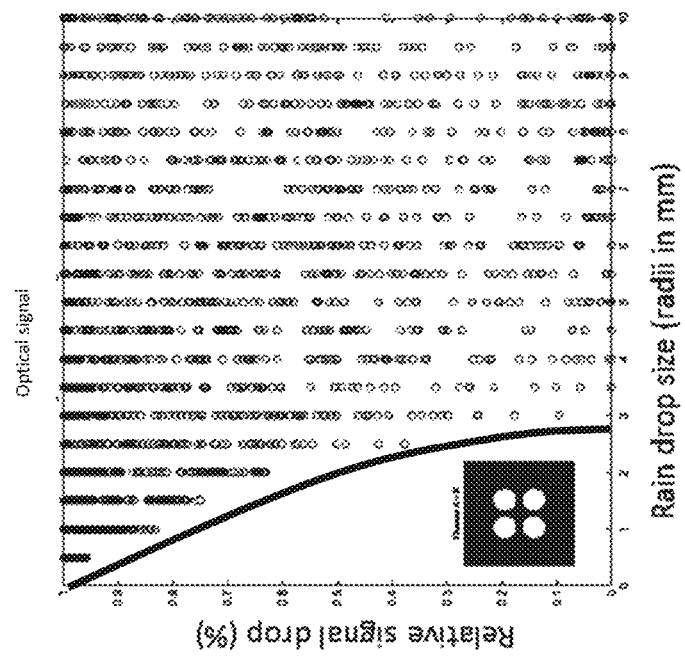
FIG. 11 shows relative optical signals observed as a function of rain drop size for the alternative arrangement of rain-sensitive areas depicted in FIG. 7.

FIG. 11 indicates that if the rain-sensitive areas reside on the corners of a square, i.e., form a minimal quadratic array, the maximal signal drop $\Delta S_{max}$ scales accordingly to the droplet size. Indeed, for each arrangement of the sensitive areas, the relationship between the $\Delta S$ and the minimal rain drop size is particular and not necessarily linear. In contrast, as shown above, $R_{min}$ is linear in $\Delta S$ if the rain-sensitive areas form a linear chain. Thus, in the latter case, $R_{min}$ is more sensitive to $\Delta S$. For this reason, for precise determination of $R_{min}$, the embodiment in which the rain-sensitive areas form a linear chain is preferable over the embodiment in which the rain-sensitive areas form a quadratic array.

In summary, referring back to FIG. 2, a minimal rain drop size may be inferred from the number of sensitive areas touched by droplets. In other words, the minimal rain drop size can be also defined from a discrete point of view, where the proportion of covered sensitive areas are not available but only the fact that they are covered (partially or totally).

Figure 12:
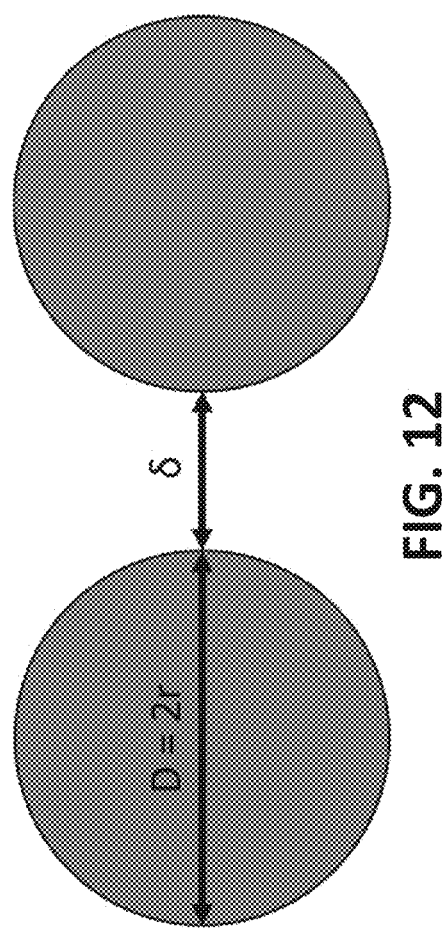
FIG. 12 shows two adjacent rain-sensitive areas according to another embodiment.

Here, the terminology indicated in FIG. 12 is used, $\delta$ denoting the distance between the rims of adjacent rain-sensitive areas, D denoting the diameter of the sensitive areas (r is the radii; D=2r). Here, the terminology for the next equation, is $A_i$ with $i=1, \ldots, n$ denoting the size of rain-sensitive area i, and $\Delta A_i$ the size of rain-sensitive area i covered by a rain droplet, $\Delta S = \Sigma_i A_i / \Sigma_i A_i$ denoting the relative size of rain-sensitive area covered by a droplet, n the number of sensitive areas on the sensor.

The determination of the minimal rain drop size can be computed with two strategies:
(1) the relative signal drop $\Delta A_i$ is measured (on each rain sensitive area) and said minimal drop size is calculated from Eq. 1;
(2) the number of rain sensitive areas impacted by droplet are counted and said minimal drop size is calculated as Eq. 2.

According to Eq. 1, the radius of the minimal drop size is described as:

$$R_{min} = f(n, D, \delta, \Delta A_i) \quad \text{(Eq. 1)}$$

For a single circular rain sensitive area, the minimum rain drop radius is given by Eq. 1A:

$$R_{min} = \Delta S^{1/2} r \quad \text{(Eq. 1A)}$$

With multiple rain-sensitive areas, the equation needs to be defined differently (with Monte-Carlo simulation for example). It depends on the geometry of the active surface (circle, square, linear chain, quadratic array . . . ) of the sensor and on the shape of the droplet.

However, one special case can be modeled. When considering rain-sensitive areas arranged in a linear chain as in the embodiment shown in FIG. 4 (top panel) or FIG. 6, a given rain-sensitive area being completely covered by a droplet or completely free from any droplet, the equation becomes $$R_{min} = [k(D+\delta) - \delta]/2 \quad \text{(Eq. 1B)}$$

The previous equation is just a simplification and valid only for particular cases.

Equation 2 reads $$R_{min} = [(k-2)*(D+\delta) + \delta]/2 \text{ with } (k>1) \quad \text{(Eq. 2)}$$

REFERENCE NUMERALS

| Reference Numeral | Description |
|---|---|
| 100 | Pane |
| 102 | First surface |
| 104 | Second surface |

-continued

REFERENCE NUMERALS

| Reference Numeral | Description |
| --- | --- |
| 106 | Flat solid layer; first optical coupling means |
| 108 | Intermediate soft layer; second optical coupling means |
| 110 | Light emitting diode (LED) |
| 112 | Photodiode |
| 114 | Incident light beam |
| 115 | Rain drop |
| 117 | Half space above second surface of the pane |
| 118 | Rain-sensitive area |
| 120 | Power and measurement circuit |

What is claimed is:

1. A rain sensor to be mounted on a first surface of a pane in order to detect an amount of moisture on an opposing second surface of the pane, the rain sensor comprising:
   at least one emitter for emitting electromagnetic radiation, directed from the first surface to the second surface to form at least one rain-sensitive area on the second surface;
   at least one receiver for sensing radiation emitted by the emitter and that has been internally reflected at the rain-sensitive areas, and for generating an output signal indicative of the amount of moisture on the rain-sensitive area; and
   a control unit that is operable to calculate a minimal droplet size based on the output signal;
   wherein the at least one emitter and the at least one receiver are attached to a solid layer, and wherein the solid layer is attached to a soft layer that is interposed between the solid layer and the first surface of the pane, wherein the solid layer and the soft layer are optically transparent.

2. The rain sensor according to claim 1, comprising more than one rain-sensitive areas arranged in a linear chain.

3. The rain sensor according to claim 2, further comprising a radiation focusing means for guiding the electromagnetic radiation.

4. The rain sensor according to claim 1, comprising more than one rain-sensitive areas arranged in a quadratic array.

5. The rain sensor according to claim 4, further comprising a radiation focusing means for guiding the electromagnetic radiation.

6. The rain sensor according to claim 1, further comprising a radiation focusing means for guiding the electromagnetic radiation.

7. The rain sensor according to claim 6, further comprising an optical coupling to be arranged between the pane and the optical focusing means.

8. The rain sensor according to claim 1, comprising more than one rain sensitive areas, wherein the rain sensitive areas are each equally sized.

9. The rain sensor according to claim 8, wherein the rain sensitive areas each have a radius of from about 0.2 mm to 10 mm.

10. The rain sensor according to claim 1, comprising more than one rain sensitive areas, wherein the adjacent rain sensitive areas are spaced an equal distance apart.

11. The rain sensor according to claim 10, wherein adjacent rain sensitive areas are spaced apart a distance of from about 0 to 10 mm as measured between centers the of adjacent rain sensitive areas.

12. A method for determining a minimal rain droplet radius from the signal of a rain sensor comprising the steps of:
   directing electromagnetic radiation from at least one emitter mounted on a first surface or a pane to a second surface of the pane to form at least two rain-sensitive areas on the second surface;
   detecting the electromagnetic radiation emitted by the emitter by at least one receiver for sensing radiation mounted on the first surface, wherein the radiation has been internally reflected at the rain-sensitive areas;
   generating an output signal from the at least one receiver indicative of an amount of moisture on the rain-sensitive area, wherein the output signal is directed to a control unit; and
   calculating a minimal droplet size based on the output signal, wherein the step of calculating is performed by the control unit and is based on mathematical computation.

13. The method according to claim 12, wherein at least one of the rain-sensitive areas has an essentially circular outline.

14. The method according to claim 13, wherein the circular outline has a radius of from about 0.2 mm to 10 mm.

15. The method according to claim 13, wherein the two or more a rain-sensitive areas have an identical sized radius.

16. The method according to claim 15, wherein centers of adjacent rain-sensitive areas are distanced apart by a minimum distance that is approximately twice the radius.

17. The method according to claim 16, wherein adjacent rain-sensitive areas are distanced from each other by equal distances.

18. The method according to claim 12, wherein the two or more rain-sensitive areas form a linear array.

19. The method according to claim 12, wherein during the step of calculating, the minimal droplet sized is mathematically determined by an area of a rain sensitive area covered by a rain drop or by the number of rain sensitive areas covered by a rain drop.

20. The method according to claim 12, wherein the two or more rain-sensitive areas form a quadratic array.

* * * * *